United States Patent [19]

Hart

[11] 4,186,815

[45] Feb. 5, 1980

[54] SUSPENSION AND DRIVE FOR TANDEM WHEEL VEHICLE

[75] Inventor: Cullen P. Hart, Peoria, Ill.

[73] Assignee: Caterpillar Tractor Co., Peoria, Ill.

[21] Appl. No.: 864,996

[22] Filed: Dec. 27, 1977

[51] Int. Cl.² .................... B60G 17/00; B62D 61/10
[52] U.S. Cl. .................................. 180/41; 180/24.08;
 180/73 R; 280/6 H; 280/709
[58] Field of Search ............... 180/22, 24.02, 24.08,
 180/24.11, 44 R, 73 R, 43 B, 24, 41; 280/6 H,
 704, 705, 709, 43.23, 6.1, 6.11, 676

[56] References Cited

U.S. PATENT DOCUMENTS

| | | | |
|---|---|---|---|
| 2,775,307 | 12/1956 | Hill | 180/73 R X |
| 3,083,782 | 4/1963 | Ivaldi | 180/43 B |
| 3,186,730 | 6/1965 | Angell | 280/6 H |
| 3,191,954 | 6/1965 | Schuetz | 280/43.23 X |
| 3,495,672 | 2/1970 | Barr | 180/24 |
| 3,784,228 | 1/1974 | Hoffman | 280/6 H |
| 3,970,327 | 7/1976 | Dezelan | 280/709 |
| 3,983,950 | 10/1976 | Fabian | 180/24 |
| 4,031,997 | 6/1977 | Nelson | 280/6 H |

*Primary Examiner*—Joseph F. Peters, Jr.
*Assistant Examiner*—Randall A. Schrecengost
*Attorney, Agent, or Firm*—Phillips, Moore, Weissenberger, Lempio & Majestic

[57] ABSTRACT

A construction vehicle has pairs of tandem roadwheels on each side thereof. Each of the roadwheels is mounted to the vehicle via a parallelogram linkage. The roadwheels are each driven by drives universally mounted to transmit power from differentials thereto. Interconnected hydraulic cylinders act between the frame and each wheel to adjust the relative vertical positioning therebetween and provide equal tire loading on the tires on each side.

5 Claims, 5 Drawing Figures

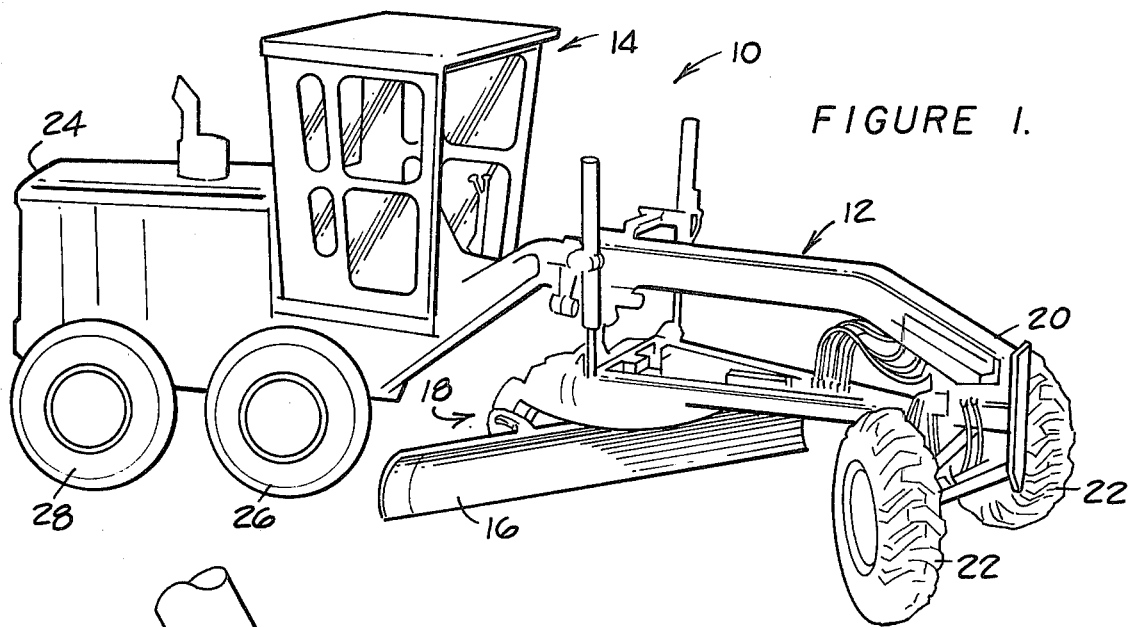
FIGURE 1.
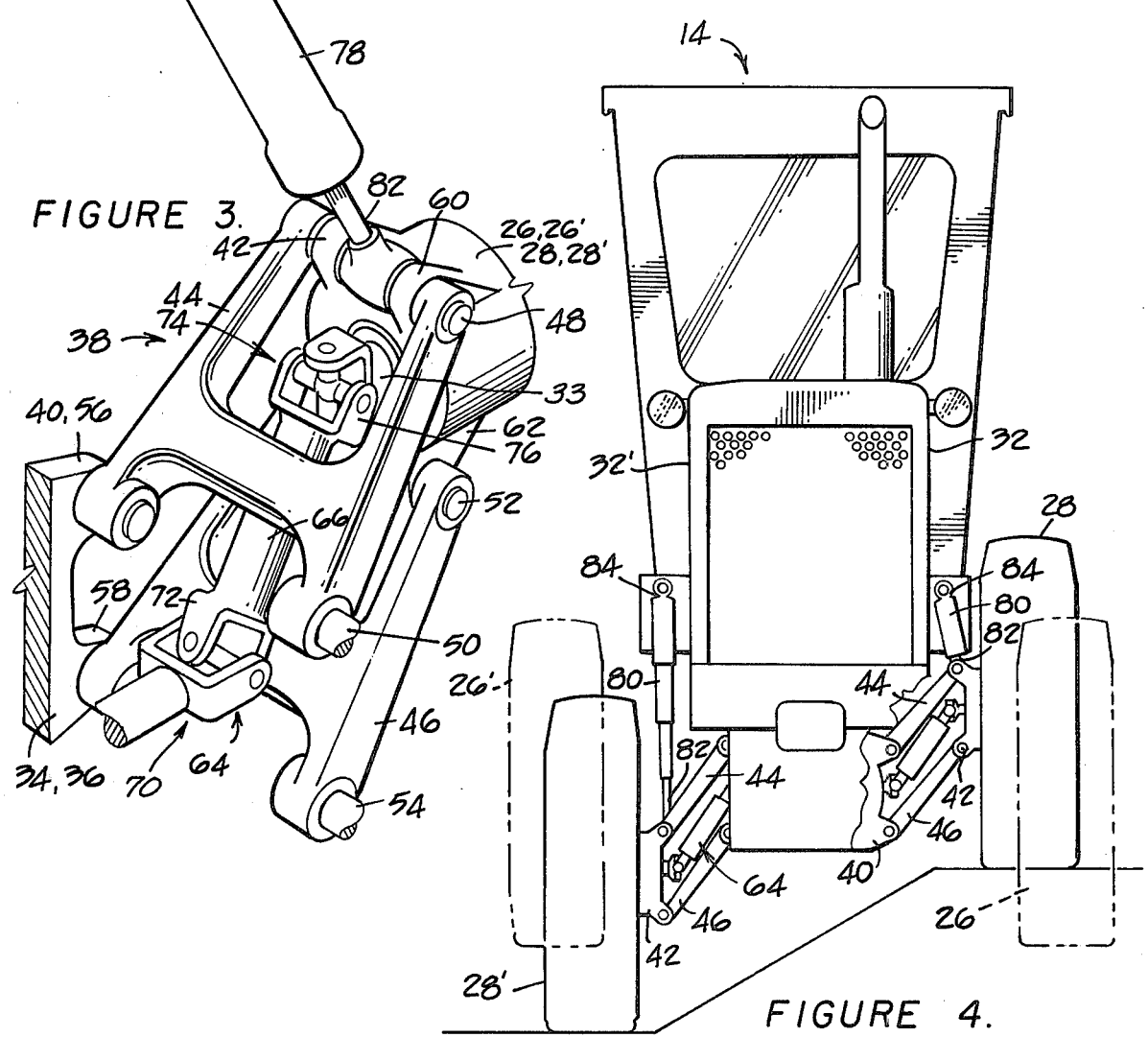
FIGURE 3.
FIGURE 4.

SUSPENSION AND DRIVE FOR TANDEM WHEEL VEHICLE

BACKGROUND OF THE INVENTION

1. Field of the Invention

This invention relates to a tandem roadwheel system as employed on a vehicle, especially a construction vehicle such as a motor grader.

2. Prior Art

A motor grader is oft times operated on uneven terrain whereby the tandem roadwheels on one lateral side of the vehicle are placed vertically below the tandem roadwheels mounted on the opposite side of the vehicle. Also, the tandem roadwheels on one side of the vehicle may individually be placed at different vertical positions because one of the roadwheels may be riding over a rock, dipping into a ditch or the like. The resulting tilting of the vehicle may thus give rise to operational problems such as reduced tractive effort of the vehicle and a reduction in drawbar pull. In addition, conventional tandem mounted rubber tires employed on conventional motor graders essentially function as undampened springs which do not provide the suspension properties desired for earthworking operations. Further, equal roadwheel loading is generally not provided under all conditions in a motor grader. Still further, motor graders normally do not provide means for levelling the main frame and operators station structure when the vehicle is traversing an angled side slope for the purpose of grading same. This causes operator discomfort and reduced control with resulting decreased productivity.

SUMMARY OF THE INVENTION

The present invention is directed to overcome one or more of the problems as set forth above.

According to the present invention, an improvement is provided in a tandem roadwheel system for a construction vehicle. The system includes a vehicle frame having two longitudinally separated axle members supported thereadjacent. A first pair of roadwheels are located on opposite sides of the frame adjacent a first of the axle members. A second pair of roadwheels are likewise located adjacent a second of the axle members. There are four linkages independently mounting each respective one of the roadwheels to the vehicle to allow independent vertical movement of the roadwheels relative to the frame. Four generally vertically acting hydraulic motors are disposed for acting between the frame and each respective one of the roadwheels for adjusting the relative vertical positioning therebetween. The improvement comprises drive shafts universally mounted between each roadwheel and the adjacent axle member. A source of pressurized fluid is carried by the vehicle. First conduit means connect the expansion ends of the motors on the first side of the vehicle. Second conduit means serve the same purpose of the second side of the vehicle. The pressurized fluid source is selectively couplable to the first conduit means and to the second conduit means.

BRIEF DESCRIPTION OF THE DRAWING

The invention will be better understood by reference to the figures of the drawings wherein like numbers denote like parts throughout and wherein:

FIG. 1 illustrates, in side perspective view, a motor grader employing the tandem roadwheel system of the present invention;

FIG. 3 illustrates, in blown-up perspective, parallelogram linkage means useful in the tandem roadwheel system of the present invention;

FIG. 4 illustrates, in back view on a side slope, a motor grader equipped with the tandem roadwheel system of the present invention.

DETAILED DESCRIPTION OF THE REFERRED EMBODIMENT

Figure 2:
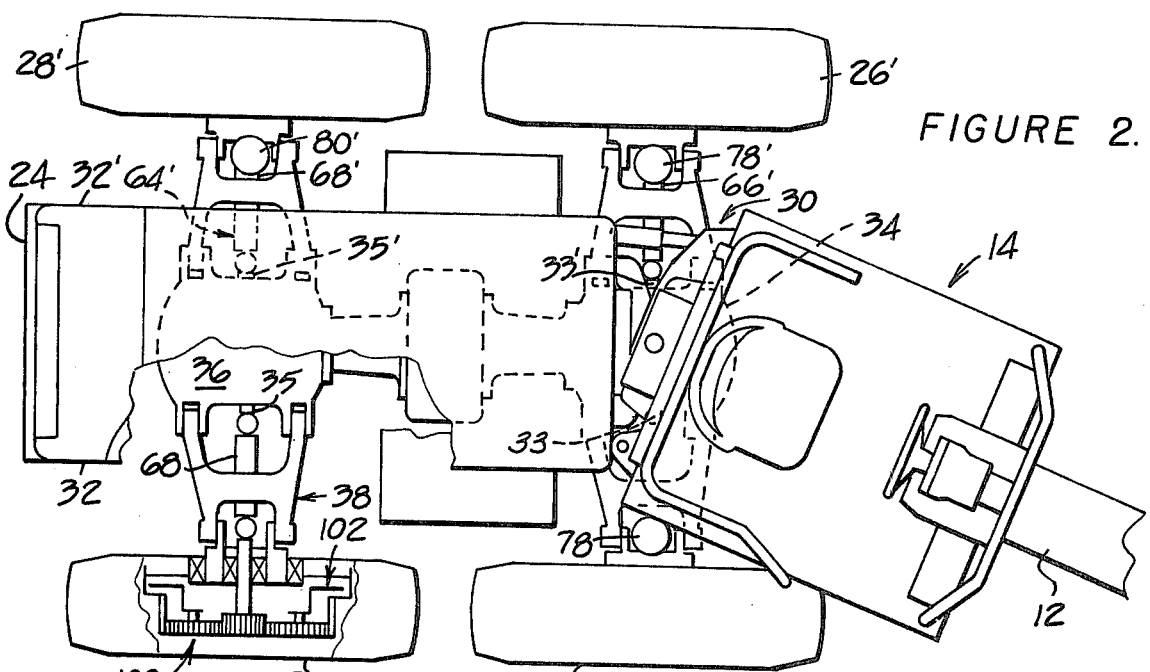
FIG. 2 illustrates, in partial view, partially broken away and partially schematically, a motor grader utilizing a tandem roadwheel system in accordance with the present invention.

Adverting to FIGS. 1 and 2 there is illustrated a motor grader 10 comprising a main frame 12 having an operator's cab 14 mounted rearwardly thereon. The motor grader 10 comprise a conventional mold board 16 suitably extended beneath the frame 12 by conventional mechanisms including a circle drawbar 18. A forward end 20 of the frame 12 is supported on a pair of laterally spaced front roadwheels 22 whereas a rearward end 24 of the frame 12 is supported on a pair of first or forward roadwheels 26 and a pair of second or rearward roadwheels 28. The motor grader 10 is of the conventional articulated variety and is articulated about a joint 30 of a conventional nature. One of the first pair of roadwheels 26 and one of the second pair of roadwheels 28, mainly those which are on a first lateral side 32 of the motor grader 10 are, for convenience, labelled simply 26 and 28 while the other of the first or forward pair of roadwheels 26 and the other of the second or rearward pair of roadwheels 28, namely those which appear on an opposite lateral side 32' of the motor grader 10 are labeled, for clarity 26' and 28'. It will be noted that the roadwheels 26 and 28 form a tandem arrangement as do the roadwheels 26' and 28'.

A pair of axle members 33-33' and 35-35' (33',35 and 35' shown in FIG. 2) proceeding from a pair of differentials 34 and 36 are provided with said differentials being supported by the frame 12 with a first 34 of the pair of differentials being supported by the frame 12 forwardly of the second 36 of the pair of differentials. The first pair of roadwheels 26, 26' are mounted adjacent the first or forwardmost of the differentials 34 while the second pair of roadwheels 28, 28' are mounted adjacent the second or rearwardmost of the differentials 36.

Parallelogram linkage means are provided for independently mounting each respective one of the roadwheels 26, 26', 28, 28' to the motor grader 10 to allow independent vertical movement of each of the roadwheels 26, 26', 28, 28' relative to the frame 12. The parallelogram linkage means in the preferred embodiment of the invention is illustrated as a parallelogram linkage 38 and may be seen most clearly in FIG. 3. Briefly, first bracket means 40 extend from each of the differentials 34 and 36 towards each of the roadwheels 26, 26', 28 and 28' respectively. Similarly, second bracket means 42 are supported by each of the respective roadwheels 26, 26', 28, 28' for connection with the respective of the parallelogram linkages 38. The arallelogram linkage 38 then comprises a top member 44 and a bottom member 46 each pivotally mounted via respective generally horizontal pivot pins 48, 50, 52, and 54 to the first and second bracket means 40 and 42. It is noted that the first bracket means 40 comprises a pair of spaced apart brackets 56 and 58 and that likewise the second bracket means 42 comprise a pair of spaced apart brackets 60 and 62. Hence, the separation between the brackets 56 and 58 forms one side of the parallelogram linkage 38 while the separation between the bracket 60 and 62 forms another side thereof. Due to the generally horizontal alignment of the respective pivot pins 48, 50, 52 and 54 it will be clear that the roadwheels 26, 26', 28 and 28' are restricted to generally vertical motion. Further, since the roadwheels 26, 26', 28 and 28' are located laterally relative to the respective differentials 34 and 36, it will be noted that the parallelogram linkage 38 serves to restrict vertical movement of the roadwheels 26, 26', 28, and 28' to be generally within a plane perpendicular to the longitudinal extension of the motor grader 10 thereadjacent. It is further noted that the aforementioned parallelogram linkage 38 serves to independently mount each respective one of the roadwheels 26, 26', 28, 28' to a respective lateral side of each one of the differentials 34 and 36, respectively.

Drive means 64 are universally mounted to transmit power from each respective one of the axle members 33-33', 35-35' extending from the differentials 34 and 36 to a respective pair of roadwheels 26, 26', 28, 28'. In the embodiment illustrated the drive means 64 comprises four drive shafts 66, 66', 68 and 68' respectively (see 66', 68 and 68' in FIG. 2). In FIG. 3 the drive shaft 66 is illustrated and it should be realized that each of the drive shafts 66, 66', 68 and 68' are generally identical. Universal mounting means 70 (universal joint means) serve for universally mounting a first end 72 of each respective one of the drive shafts 66, 66', 68, 68' to be driven by a respective one of the differentials 34, 36. An additional universal mounting means 74 (an additional universal joint) serves to universally mount a second end 76 of each respective one of the drive shafts 66, 66',68 and 68' to drive a respective one of the roadwheels 26, 26',28 and 28'. In the particular embodiment illustrated in FIG. 3 the universal mounting means 70 and 74 are shown as dconventional X-pin mounted joints allowing rotation about a horizontal axis and a vertical axis. Other equivalent universal mounting means can of course be substituted therefor.

Means are also provided for acting between the frame 12 and each respective one of the roadwheels 26, 26', 28 and 28' for adjusting the relative vertical positioning therebetween. In the embodiment illustrated in the dradwings, the aforementioned adjusting means comprises four generally vertically oriented hydraulic motors 78, 78', 80 and 80', respectively (See FIG. 2). Each of the motors 78, 78', 80 and 80' is disposed between the frame 12 and a respective one of the roadwheels 26, 26', 28 and 28'. Generally, a rod end 82 of each of the respective hydraulic motors 78, 78', 80 and 80' is attached to the respective one of the roadwheels 26, 26', 28 and 28' while a head end 84 of each of the respective motors 78, 78', 80 and 80' is attached to the frame 12.

Figure 5:
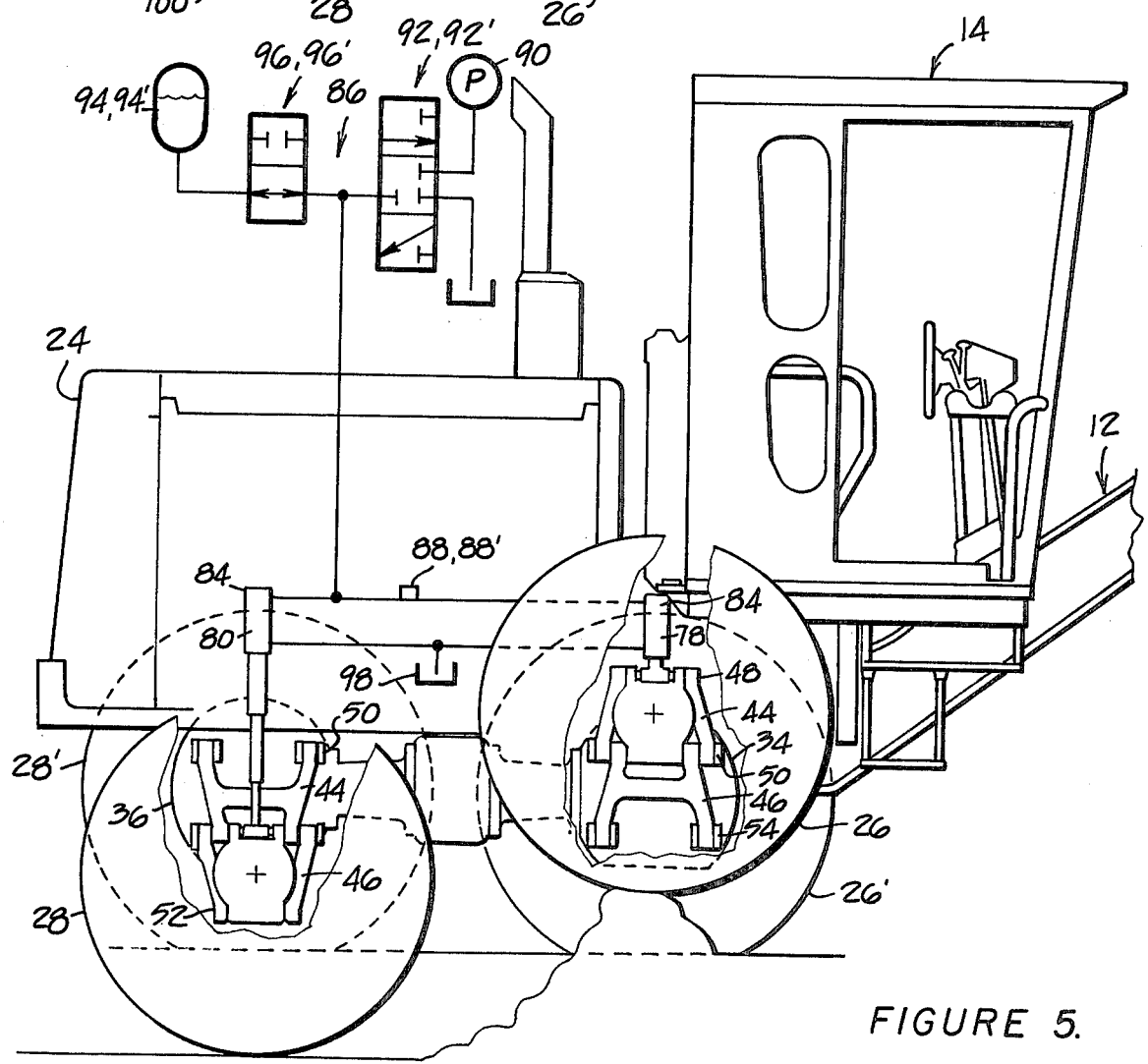
FIG. 5 illustrates, in partial side elevational view, a motor grader employing the tandem roadwheel system of the present invention and showing schematically a hydraulic system useful therewith.

Adverting now to FIG. 5, there is illustrated therein a hydraulic system 86 in schematic form for controlling the action of the hydraulic motors 78, 78', 80 and 80'. Briefly, a first conduit 88 serves to interconnect the head ends 84 of the two hydraulic motors 78 and 80 on the first lateral side 32 of the frame 12 while a second conduit 88' serves to interconnect the head ends 84 of the two hydraulic motors 78' and 80' on the second lateral side 32' of the frame 12. In this manner, if for example the roadwheel 26 rises over an obstruction and roadwheel 28 drops into a depression, then fluid is shifted via the first conduit means 88 from the head end 84 of the hydraulic motor 78 to the head end 84 of the hydraulic motor 80 thus allowing full traction to be kept by each of the wheels 26 and 28. It should further be noted that pressure from the head end of the cylinder 78 is directed to the head end of the cylinder 80 to cause the roadwheel 28 to assume more of the vehicle load even if the roadwheel 28 remains on level ground. A source of pressurized fluid, in the embodiment illustrated a pump 90 is supported by the motor grader 10 and is selectively coupled via a first valve 92 with the first conduit 88. Similarly, the pump 90 is selectively coupled via second symmetrical valve means 92' with the second conduit 88'. A first accumulator 94 is supported by the motor grader 10. Means, in the embodiment illustrated a valve 96 is provided for selectively communicating the first accumulator 94 with the first conduit 88. Similarly a second accumulator 94' is supported by the motor grader 10 and a valve 96' is provided for selectively communicating the second accumulator 94' with the second conduit 88'. If desired, a single accumulator can replace the first and second accumulators 94 and 94'. The respective rod ends 82 of the respective hydraulic motor 78, 78', 80 and 80' are connected to a sump 98 and thus each of the hydraulic motors 78, 78', 80 and 80' operate as single acting hydraulic motors. It will be noted in FIG. 4 that if the motor grader is travelling along a slope with the lateral side 32 thereof at a lower elevation than the lateral side 32' thereof, then through operator control the valve 92 can be shifted to allow fluid from the pump 90 to be supplied to the first conduit 88 and hence to expand the cylinders 78 and 80. This will lead to the cab 14 being kept generally level even under such slope operation.

Adverting now primarily to FIG. 2 it will be noted that the present invention is particularly useful for operation with planetary gear means 100 which can be located within each of the roadwheels 26, 26', 28 and 28' and driven by the respective universal mounting means 74. Further, the tandem roadwheel system of the present invention is particularly adaptable to providing brake means 102 mounted on each of the roadwheels 26, 26' 28 and 28' as is presently required by OSHA laws. The resulting gear and brake system is easy to operate and service as well as being operational over substantially all alignments of the motor grader 10.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. In a tandem roadwheel system for a vehicle having a frame; a pair of longitudinally separated axle members supported adjacent the frame; a first pair of roadwheels adjacent a first of said axle members, one of said first pair of roadwheels on a first and the other on a second lateral side of the frame; a second pair of roadwheels adjacent a second of said axle members, one of said second pair of roadwheels on said first and the other on said second lateral side of said frame; four parallelogram linkages, one independently mounting each respective one of said roadwheels to said vehicle to allow independent vertical movement of each of said roadwheels relative to said frame; four generally vertically acting hydraulic motors, each of said motors being disposed between said frame and a respective one of said roadwheels for adjusting the relative vertical positioning therebetween; the improvement comprising:

four drive shafts, one between each roadwheel and the adjacent axle member;
means for universally mounting a first end of each drive shaft to be driven by the adjacent of said axle members;
means for universally mounting a second end of each drive shaft to drive a respective one of said roadwheels;
a source of pressurized fluid carried by said vehicle;
first conduit means for interconnecting the head ends of the two hydraulic motors acting on the roadwheels on the first lateral side of the frame;
means for selectively coupling said pressurized fluid source with said first conduit means;
second conduit means for interconnecting the head ends of the two hydraulic motors acting on the roadwheels on the second lateral side of the frame; and
means for selectively coupling said pressurized fluid source with said second conduit means.

2. The improvement as in claim 1, including:
planetary gear means mounted in each of said roadwheels and driven by said drive shaft second end mounting means; and
brake means mounted in each of said roadwheels.

3. The improvement as in claim 1, including:
accumulator means supported by said vehicle;
means for selectively communicating said accumulator means with said first conduit means; and
means for selectively communicating said accumulator means with said second conduit means.

4. The improvement as in claim 1, including a pair of differentials, one of said axle members proceeding from each one of said differentials, and wherein said parallelogram linkage means independently mount each respective one of said roadwheels to a respective lateral side of a respective one of said differentials.

5. The improvement as in claim 4, wherein said parallelogram linkage means restricts vertical movement of said roadwheels to be generally within a plane perpendicular to the longitudinal extension of said vehicle there adjacent.

* * * * *